United States Patent
Nishikawa et al.

(10) Patent No.: US 8,231,117 B2
(45) Date of Patent: Jul. 31, 2012

(54) ROBOT SYSTEM

(75) Inventors: Seigo Nishikawa, Kitakyushu (JP);
Tomoyuki Shiraki, Kitakyushu (JP);
Hiroyasu Hirota, Kitakyushu (JP);
Tomohiro Matsuo, Kitakyushu (JP)

(73) Assignee: Kabushiki Kaisha Yaskawa Denki, Fukuoka (JP)

(*) Notice: Subject to any disclaimer, the term of this patent is extended or adjusted under 35 U.S.C. 154(b) by 78 days.

(21) Appl. No.: 12/878,037

(22) Filed: Sep. 9, 2010

(65) Prior Publication Data
US 2011/0140330 A1 Jun. 16, 2011

Related U.S. Application Data

(63) Continuation of application No. PCT/JP2009/052614, filed on Feb. 17, 2009.

(30) Foreign Application Priority Data

Mar. 12, 2008 (JP) ................................. 2008-062509

(51) Int. Cl.
*B23Q 1/25* (2006.01)
(52) U.S. Cl. .............................. 269/55; 269/60; 269/903
(58) Field of Classification Search .................. 269/55, 269/60, 329, 903; 395/86; 564/167.01; 901/1; 318/568.24
See application file for complete search history.

(56) References Cited

U.S. PATENT DOCUMENTS

| 5,737,500 | A | * | 4/1998 | Seraji et al. | 700/251 |
|---|---|---|---|---|---|
| 5,889,924 | A | | 3/1999 | Okabayashi et al. | |
| 6,389,698 | B1 | * | 5/2002 | Malatier | 29/897.2 |
| 6,435,941 | B1 | * | 8/2002 | White | 451/5 |
| 6,637,737 | B1 | * | 10/2003 | Beecherl et al. | 269/71 |
| 7,900,898 | B2 | * | 3/2011 | Wampler, II | 269/152 |
| 2006/0218767 | A1 | * | 10/2006 | Kilibarda | 29/281.6 |
| 2009/0249606 | A1 | * | 10/2009 | Diez et al. | 29/428 |
| 2011/0140330 | A1 | * | 6/2011 | Nishikawa et al. | 269/55 |

FOREIGN PATENT DOCUMENTS

| JP | 61-192487 | 8/1986 |
|---|---|---|
| JP | 02-202606 | 8/1990 |
| JP | 02-298482 | 12/1990 |
| JP | 07-141010 | 6/1995 |
| JP | 08-025041 | 1/1996 |
| JP | 11-077321 | 3/1999 |
| JP | 11-285894 | 10/1999 |
| JP | 2000-176867 | 6/2000 |
| JP | 2006-154942 | 6/2006 |
| WO | WO 9525991 | 9/1995 |

OTHER PUBLICATIONS

International Search Report for International Application No. PCT/JP2009/052614, May 19, 2009.
Written Opinion of the International Searching Authority for International Application No. PCT/JP2009/052614, May 19, 2009.

* cited by examiner

*Primary Examiner* — Lee D Wilson
(74) *Attorney, Agent, or Firm* — Ditthavong Mori & Steiner, P.C.

(57) ABSTRACT

The present invention provides a robot system in which a robot and a positioner are combined with each other. In the robot system, footprint is reduced and a production line having a short tact time between steps is formed. The robot system includes a work object, robots that perform a work operation on the work object, and positioners that position the work object, wherein the robots are provided on frame members of the positioners.

15 Claims, 6 Drawing Sheets

ROBOT SYSTEM

CROSS-REFERENCE TO RELATED APPLICATIONS

The present invention is a continuation application of PCT/JP2009/052614, filed Feb. 17, 2009, which claims priority to Japanese Patent Application No. 2008-062509, filed Mar. 12, 2008. The contents of these applications are incorporated herein by reference in their entirety.

BACKGROUND OF THE INVENTION

1. Field of the Invention

The present invention relates to a robot system using a robot.

2. Discussion of the Background

A typical example of a production line including a production process is a welding line of automobile parts or the like as discussed in Japanese Unexamined Patent Application Publication No. 2-202606. As an example of hitherto provided welding line systems, a welding line system that uses a positioner for positioning a robot and parts is proposed. The structure of the system is an exemplary production system in which the robot is a central device. In the structure, the robot is an articulated robot having six degrees of freedom, and is mounted on a travel car. In addition, a welding torch, serving as an working tool, is secured to a wrist of the robot. Further, the positioner is disposed in a working area of the robot, and a work object is placed on the positioner. The robot, each of the peripheral devices, and a welding machine are connected to a controlling device.

As a related welding line, a welding line in which a transfer robot and a welding robot are combined with each other is proposed as in Japanese Unexamined Patent Application Publication No. 11-077321. In a structure in the welding line, a welding device includes a temporary parts tacking work table (serving as workpiece supplying means), first and second articulated transfer robots, and first to fourth welding robots. The first and second articulated transfer robots are disposed at a total of two locations, that is, at the location close to the temporary parts tacking work table and at the location that is slightly separated from the temporary parts tacking work table. The first to fourth welding robots oppose respective welding guns in a robot movable area of either of the first and second articulated transfer robots. A standby table, serving as workpiece standby means, is provided at an intermediate portion between the first and second articulated transfer robots. A car positioning portion that positions a car is provided close to the second articulated transfer robot.

SUMMARY OF THE INVENTION

According to one aspect of the present invention, there is provided a robot system comprising a work object, robots that perform a work operation on the work object, and positioners that position the work object, wherein the robots are provided on frame members of the positioners.

According to another aspect of the present invention, there is provided a robot system comprising a work object, a robot that performs a work operation on the work object, and a positioner that includes a frame member and positions the work object, wherein the robot is provided on the frame member of the positioner, and the positioner and the robot operate in cooperation to perform the work operation on the work object.

According to another aspect of the present invention, there is provided a robot system comprising a work object, robots that perform a work operation on the work object, and positioners that include frame members and position the work object, wherein the robots are provided on the frame members of the positioners, and the positioners and the robots are disposed adjacent to each other in a transfer direction of the work object so as to oppose each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompany drawings, wherein.

DESCRIPTION OF THE PREFERRED EMBODIMENTS

Embodiments will now be described with reference to the accompanying drawings, wherein like reference numerals designate corresponding or identical elements throughout the various drawings.

Figure 1:
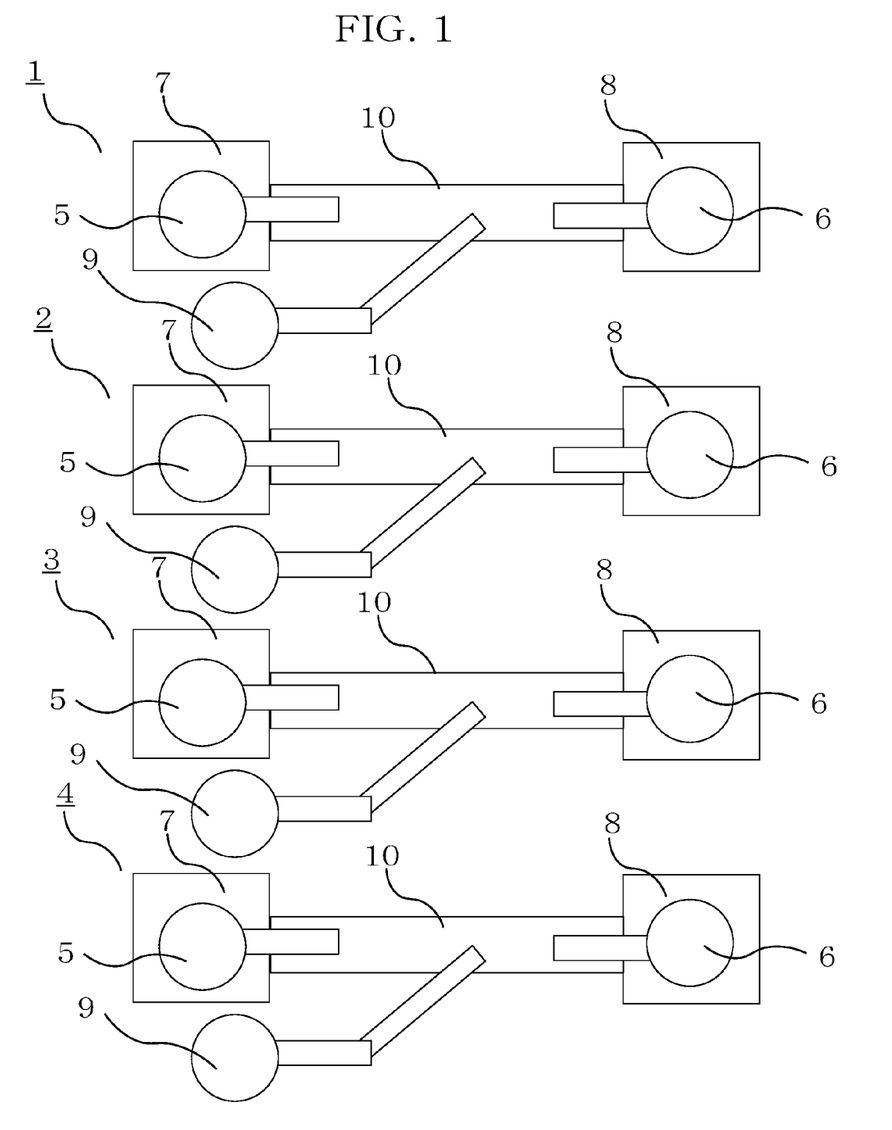
FIG. 1 is a top view of a robot system according to a first embodiment.

A top view of a robot system according to a first embodiment is shown in FIG. 1. A work object 10 is, for example, a long object, such as an automobile chassis. The work object 10 is mounted to a first positioner 7 and a second positioner 8 in a first welding step by a transfer robot (not shown). Next, the first positioner 7 and the second positioner 8 are rotated in accordance with a welding portion, so that a predetermined location of the work object is welded by the first welding robot 5 and the second welding robot 6. When the welding ends, the work object 10 is transferred to a second welding step by a transfer robot 9. Even in the second welding step, similar work operations are performed. After successively performing a third welding step and a fourth welding step, the work object is placed on a work table (not shown) by the transfer robot 9.

By forming such a robot system, it is possible to perform successive steps even on the long work object without making a production line long. In addition, by setting a transfer direction of the long object in a direction in which the long object is passed between the opposing robots, a transfer distance between the steps can be reduced, so that tact time is reduced.

Figure 2:
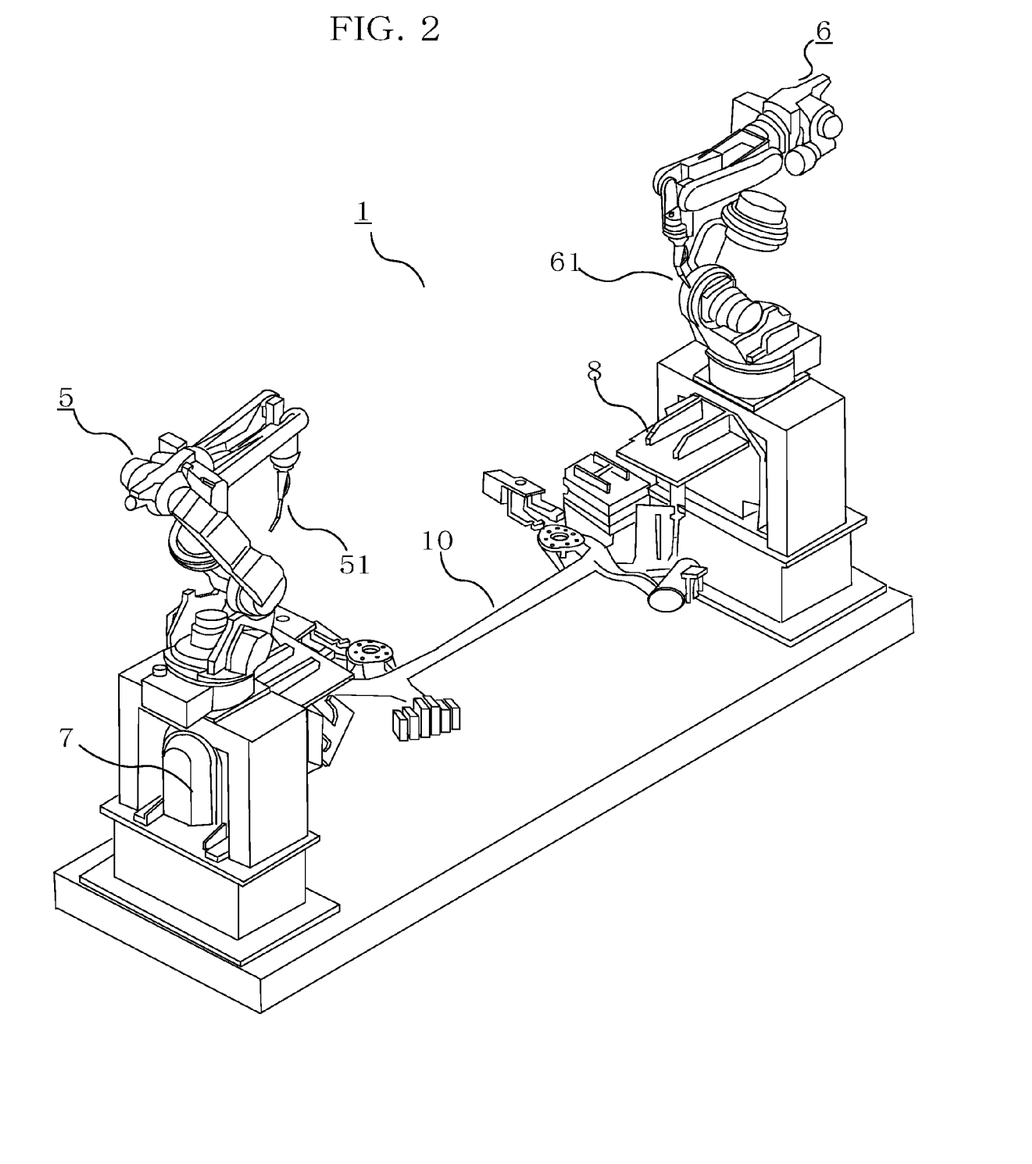
FIG. 2 is a perspective view of a standby orientation of a welding robot in the robot system according to the first embodiment.
Figure 3:
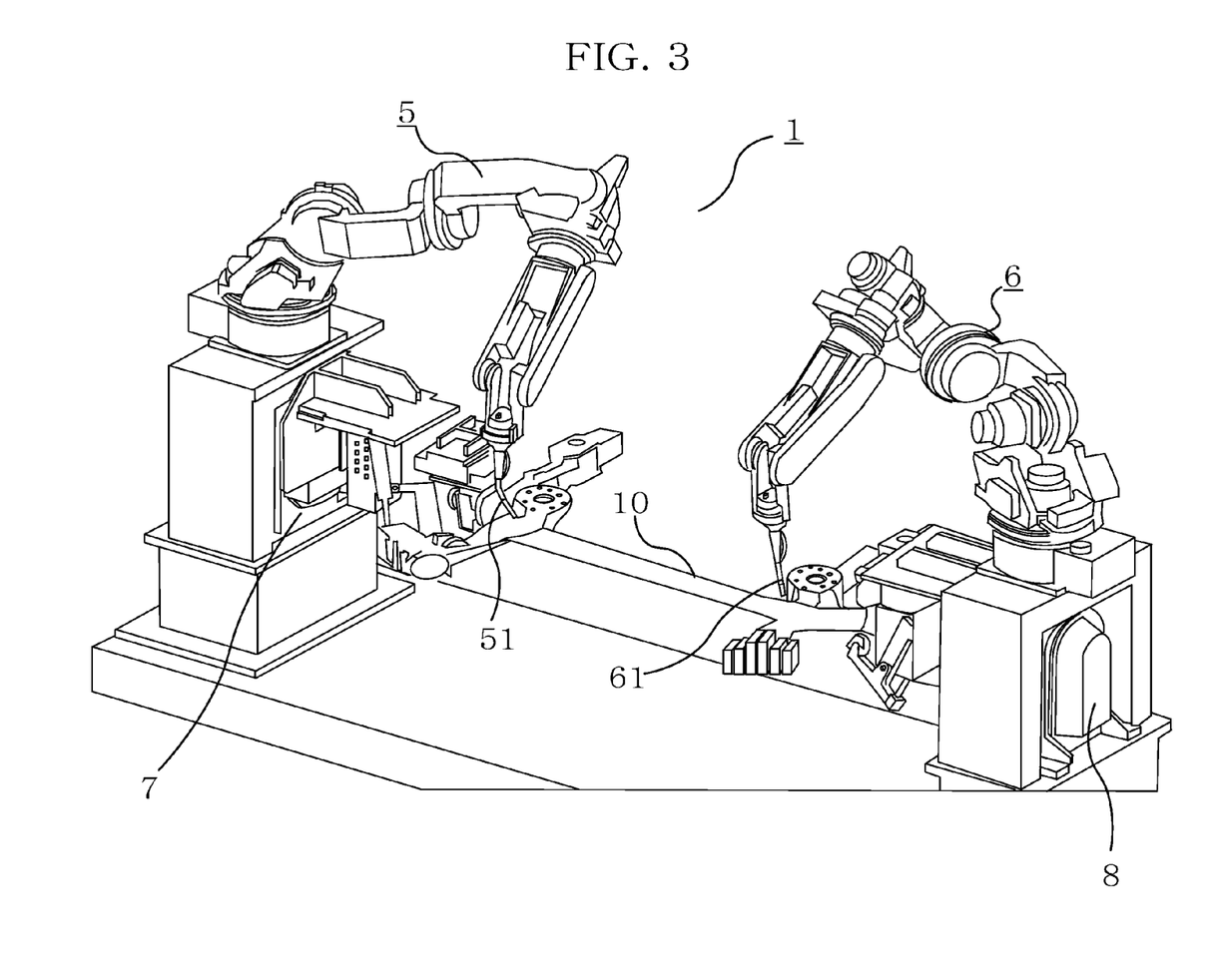
FIG. 3 is a perspective view of a welding orientation of the welding robot in the robot system according to the first embodiment.

Next, using the first welding step as an example, details of the work operation will be described with reference to FIGS. 2 and 3. A perspective view of a case in which the welding robots are positioned at standby positions is shown in FIG. 2. A perspective view of a case when welding is performed is shown in FIG. 3. As shown in FIG. 2, in the first welding step 1, the first welding robot 5 and the second welding robot 6 are disposed on the first positioner 7 and the second positioner 8, respectively, so that the first welding robot 5 and the second welding robot 6 and the first positioner 7 and the second positioner 8 oppose each other. A welding torch 51 and a welding torch 61 are provided at an end of the first welding robot 5 and an end of the second welding robot 6, respectively, and are formed so as to weld predetermined locations of the work object 10.

The first positioner 7 and the second positioner 8 rotate around an axial center in a longitudinal direction of the work object 10. That is, the first positioner 7 and the second positioner 8 oppose each other, and are disposed so that their rotational centers lie on the same axis. As shown in a welding operation shown in FIG. 3, when welding predetermined locations of the work object 10, the first welding robot 5 and the second welding robot 6 approach the work object 10 from above the work object 10, and can perform the welding even at locations close to the first welding robot 5 and the second welding robot 6. By a cooperative operation between the first welding robot 5 and the second welding robot 6 and a cooperative operation between the first positioner 7 and the second positioner 8, when the back surface of the work object 10 is to be welded, it is possible to perform the welding operation by rotating the first positioner 7 and the second positioner 8 that operate in cooperation with each other and by causing a welding location to face the first welding robot 5 and the second welding robot 6.

Here, although the work object is moved by causing two positioners to operate in cooperation with each other, one of the units may be a positioner and the other unit may be a rotatable mechanism as long as their load weights correspond to the load weights of the two positioners. In addition, although, in the embodiment, the positioners are described as being rotary driving mechanisms, they may be perpendicular stages having three axes. Obviously, any positioners may be used as long as they position the weld object with respect to the welding robots.

By virtue of such a structure, the positioners are used as bases of the welding robots, so that it is possible to eliminate setting space thereof, as a result of which footprint can be reduced.

Figure 4A:
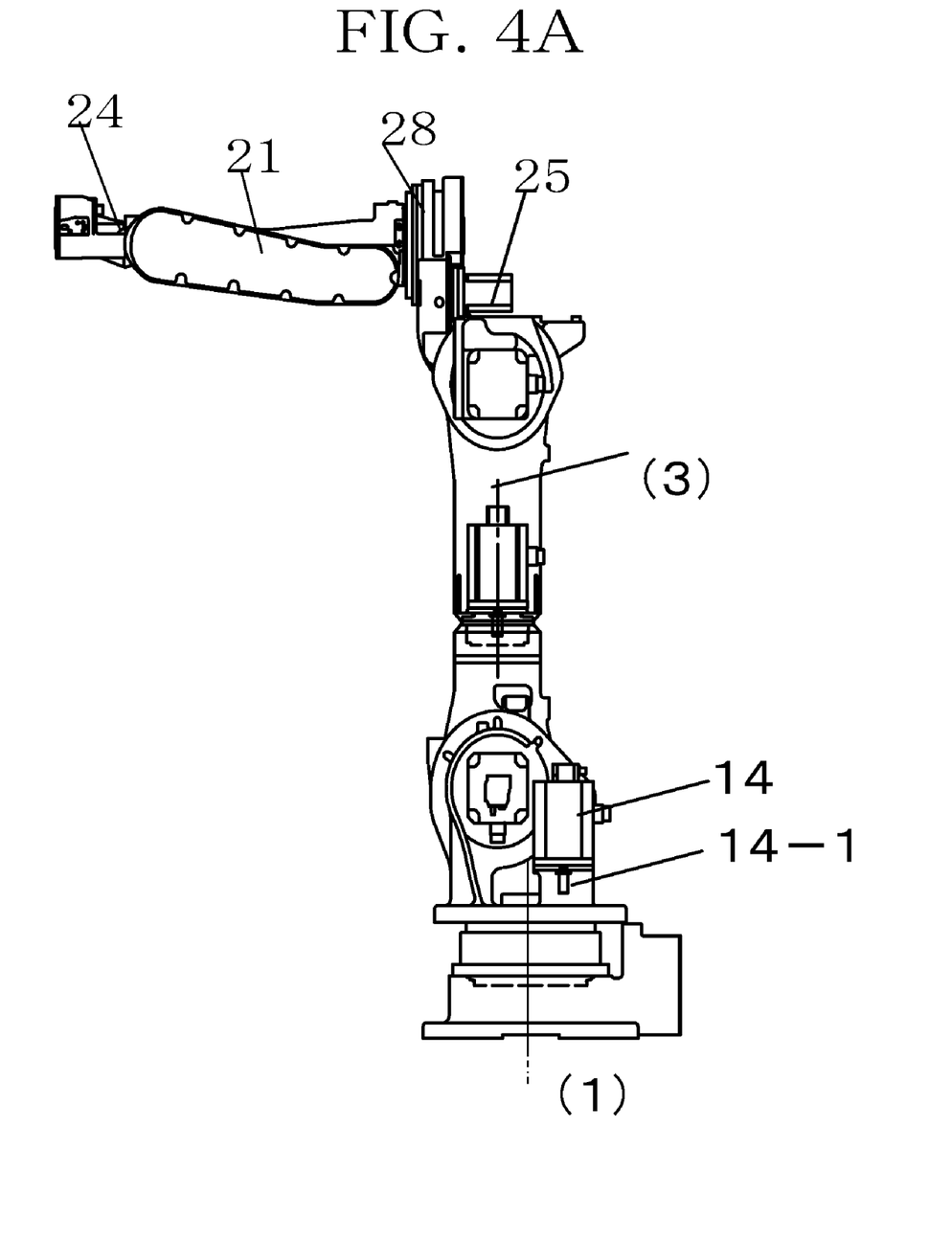
FIG. 4A is a side view of the welding robot in the robot system according to the first embodiment.
Figure 4B:
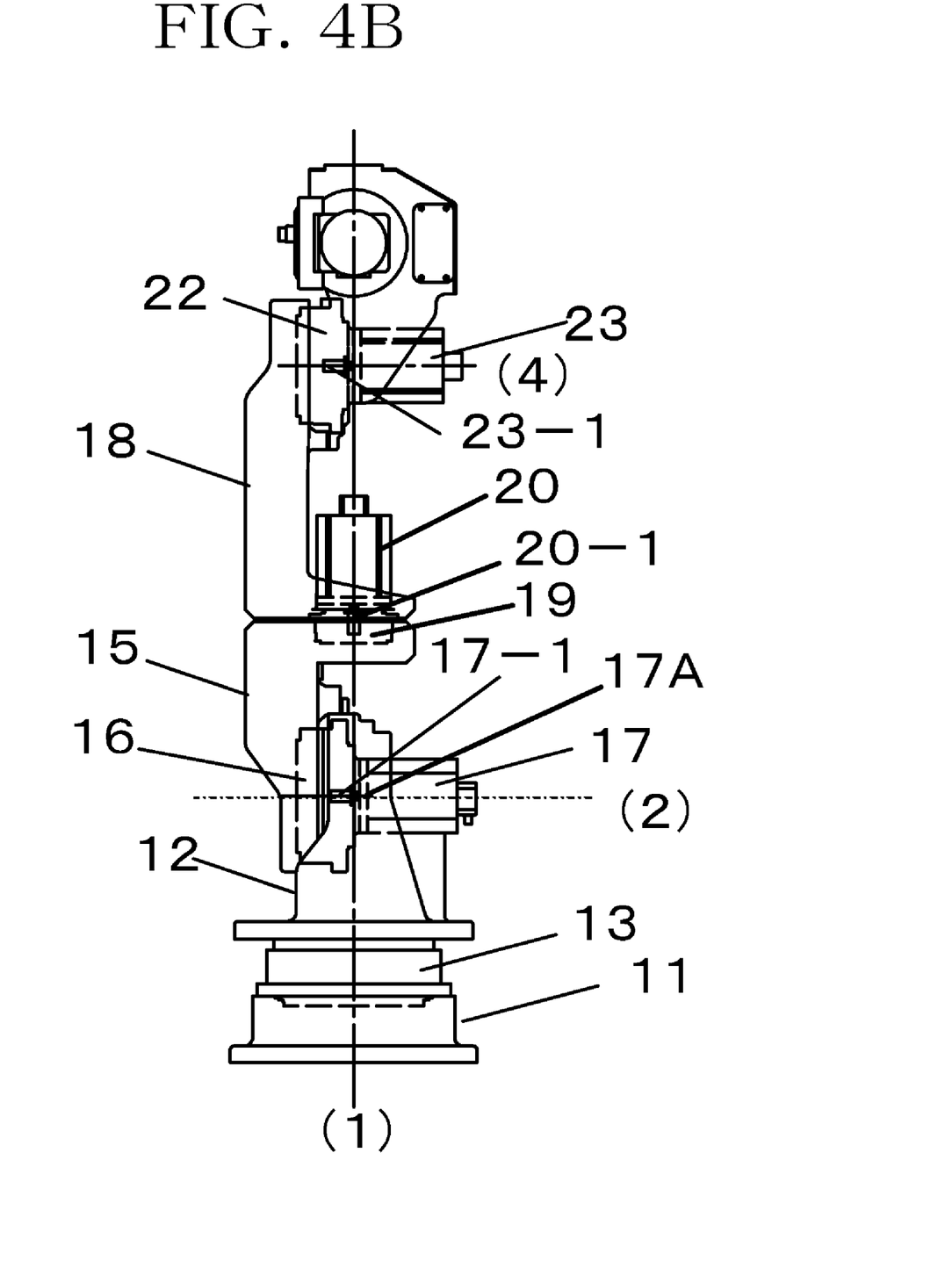
FIG. 4B is a front view of the welding robot in the robot system according to the first embodiment.

Next, details of the welding robots will be described with reference to FIGS. 4A and 4B. Each welding robot is a vertical articulated robot having seven degrees of freedom. A side view of the welding robot is shown in FIG. 4A, and a front view of the welding robot is shown in FIG. 4B. In FIGS. 4A and 4B, a rotational axis center (1) is oriented perpendicularly to the floor. A rotating driving motor 14 is mounted to a rotating table 12. An output shaft 14-1 of the rotating driving motor 14 is connected to an input shaft of a speed reducer 13. The rotating speed reducer 13 is rotatably supported by both a robot base 11 and a rotating table 12. The rotating table 12 and the speed reducer 13 are disposed on the rotational axis center (1).

A driving motor 17 for a first upper arm 15 is mounted on a second rotational axis center (2) positioned in a plane perpendicular to the rotational axis center (1) in a space of an opening portion of the rotating table 12.

Further, an output shaft 17-1 of the driving motor 17 for the first upper arm 15 is connected to an input shaft of a speed reducer 16 for the first upper arm 15. The speed reducer 16 for the first upper arm is secured to the opening portion of the rotating table 12 and to a side surface of the first upper arm 15, and is supported so as to be rotatable around the second rotational axis center (2).

A second upper arm 18 has an inverted L shape, formed by inverting the upper and lower sides of an L-shaped member, so that the second upper arm 18 can be supported at an upper end portion of the first upper arm 15 so as to be rotatable around a third rotational axis center (3) through a speed reducer 19 disposed on the third rotational axis center (3) that is flush with the first rotational axis center (1) and that is perpendicular to the second rotational axis center (2). The length of the first upper arm 15 is determined by a length corresponding to a working area for a work operation in a range that is far from the robots. When a working area is for a work operation in a range that is close to the robots, the length of the first upper arm 15 is determined by a length that is greater than or equal to that allowing replacement without a monitor unit 17A interfering with the upper end portion of the first upper arm 15.

The second upper arm 18 has an L shape that is symmetrical with respect to the first upper arm 15 so that a driving motor 20 for the upper arm is mounted to the second upper arm 18 and on the third rotational axis center (3). The second upper arm 18 is mounted to the rotating driving motor 20 for the second upper arm 18. An output shaft 20-1 of the rotating driving motor 20 for the second upper arm 18 is connected to an input shaft of a speed reducer 19 for the second upper arm 18. The speed reducer 19 for the second upper arm 18 is secured to and rotatably supported by the upper end portion of the first upper arm 15 and the bottom surface of the second upper arm 18.

A fourth rotational axis center (4) is perpendicular to and flush with the third rotational axis center (3). A driving motor 23 for a forearm 21 and a speed reducer 22 are disposed on the fourth rotational axis center.

A lower end portion of the forearm 21, situated above the second upper arm 18, is rotatably supported at an upper opening portion of the second upper arm 18 through the speed reducer 22.

Further, an output shaft 23-1 of the driving motor 23 for the forearm 21 is connected to an input shaft of the speed reducer 22 for the forearm 21. The speed reducer 22 for the forearm 21 is secured to and rotatably supported by an opening portion of the forearm 21 and a side surface of the second upper arm 18.

A rotational axis center (5) is disposed in a plane that is perpendicular to the rotational axis center (4) and that is flush with the third rotational axis center (3).

A mounting surface of a driving motor 25 that rotates a wrist assembly 24 around the fifth rotational axis center (5) is disposed at a side of the forearm 21 opposite to the wrist assembly 24, and is connected to an input shaft of a speed reducer 28 including a hole allowing a cable, disposed at an end surface of the forearm 21, to pass therethrough through a shaft and a pulley or a gear (not shown). The speed reducer 28 is secured to and rotatably supported by the end surface of the forearm 21 and an end portion of the wrist assembly 24.

Figure 5:
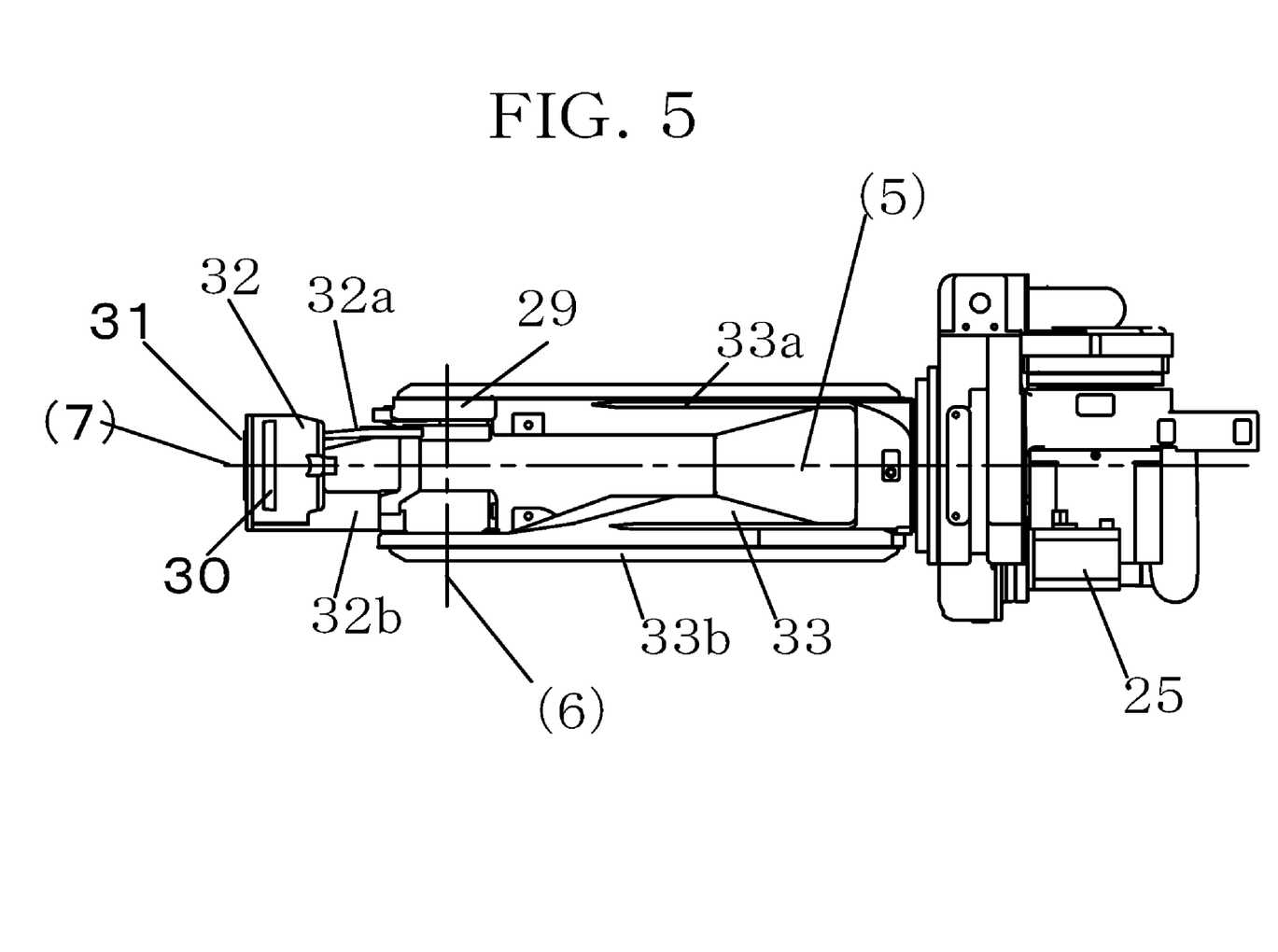
FIG. 5 is a top view of the welding robot in the robot system according to the first embodiment.

The wrist assembly 24 will be described in detail with reference to FIG. 5. The wrist assembly 24 includes a wrist base 33, a wrist 32, a flange 31, and speed reducers 29 and 30. The wrist base 33 includes two members 33a and 33b, and has the shape of a substantially U-shaped fork. A space for passing a cable therethrough is provided between the members. An end portion of the wrist 32 is provided at an end portion of the wrist base 33, and includes two portions 32a and 32b extending parallel to a seventh rotational axis center (7). The wrist 32 has the shape of a fork so as to provide a space for passing a cable therethrough between these members. The wrist 32 is connected through the speed reducer 29 so as to be rotatable around a sixth rotational axis center (6) that is perpendicular to and flush with the fifth rotational axis center (5). An end portion of the flange 31 is provided at an end portion of the wrist 32. The flange 31 is connected through the speed reducer 30 so as to be rotatable around the seventh rotational axis center (7) that is perpendicular to the sixth rotational axis center (6). A driving motor 26 for the wrist 32 and a flange driving motor 27 are connected to input shafts of the speed reduces 29 and 30 through a shaft and a pulley or a gear (not shown). A welding torch is mounted to the flange 31, and performs a welding operation.

By virtue of such a structure, when the second upper arm rotates around the third axis, a single-degree-of-freedom redundant axis is provided, so that the torch mounted to the end of the flange can operate so as to approach the vicinity of the robot.

Although, in the embodiment, an exemplary welding operation by the robots that perform work operations on a work object is described, an assembly operation, a sealing operation, and a painting operation may be performed using vertical articulated robots having redundant axes. The operations performed are not particularly limited to welding operations.

Although, in the present invention, the welding operations with the vertical articulated robots are described, it is possible to apply the present invention to general assembly, painting, and sealing operations that an industrial robot performs by providing wrist axes of the vertical articulated robots with tools or hands that handle a workpiece.

What is claimed is:

1. A robot system comprising:
   a first robot configured to perform a work operation on a work object and including a first rotating table;
   a second robot configured to perform a work operation on the work object and including a second rotating table;
   a first positioner configured to position the work object with respect to the first robot and including a first frame member with a first receiving element, the first robot being provided on the first frame member, the first rotating table being provided on the first frame member to be rotatable with respect to the first frame about a first rotational axis along a vertical direction; and
   a second positioner configured to position the work object with respect to the second robot and including a second frame member with a second receiving element, the second robot being provided on the second frame member, the second rotating table being provided on the second frame member to be rotatable with respect to the second frame about a second rotational axis along the vertical direction.

2. The robot system according to claim 1, wherein the first and second positioners are disposed perpendicularly to a transfer direction of the work object so as to oppose each other.

3. The robot system according to claim 1, wherein the first and second positioners operate to position the work object, and are coaxially disposed so that working centers thereof oppose each other.

4. The robot system according to claim 1, wherein the first and second robots are disposed perpendicularly to a transfer direction of the work object so as to oppose each other.

5. The robot system according to claim 1, wherein each robot has seven degrees of freedom.

6. The robot system according to claim 1, wherein each frame member includes a housing of the corresponding positioner.

7. A robot system comprising:
   a robot configured to perform a work operation on a work object and including a rotating table; and
   a positioner configured to position the work object with respect to the robot and including a frame member with a receiving element, the robot being provided on the frame member of the positioner, the rotating table being provided on the frame member to be rotatable with respect to the frame member about a rotational axis along a vertical direction, the positioner and the robot being configured to operate in cooperation to perform the work operation on the work object.

8. The robot system according to claim 7, wherein two pairs of the robots and positioners are provided for performing the work operation, and at least one of the positioners and at least one of the robots operate in cooperation to perform the work operation on the work object.

9. A robot system comprising:
   a first robot configured to perform a work operation on a work object and including a first rotating table;
   a second robot configured to perform a work operation on the work object and including a second rotating table;
   a first positioner configured to position the work object with respect to the first robot and including a first frame member with a first receiving element, the first robot being provided on the first frame member, the first rotating table being provided on the first frame member to be rotatable with respect to the first frame about a first rotational axis along a vertical direction, the first positioner and the first robot being disposed adjacent to each other in a transfer direction of the work object so as to oppose each other; and
   a second positioner configured to position the work object with respect to the second robot and including a second frame member with a second receiving element, the second robot being provided on the second frame member, the second rotating table being provided on the second frame member to be rotatable with respect to the second frame about a second rotational axis along the vertical direction, the second positioner and the second robot being disposed adjacent to each other in the transfer direction of the work object so as to oppose each other.

10. The robot system according to claim 1, wherein each of the first and second robots comprises:
    a first arm having a substantially L-shape and including a first base portion and a first extending portion extending from the first base portion along a third rotational axis;
    a second arm provided to be relatively rotatable with respect to the first arm about the third rotational axis and having a substantially L-shape, the second arm including a second base portion and a second extending portion extending from the second base portion along the third rotational axis, the second base portion being connected to the first base portion to be relatively rotatable with respect to the first base portion about the third rotational axis; and
    a driving motor to relatively rotate the second arm with respect to the first arm about the third rotational axis.

11. The robot system according to claim 1, wherein the first positioner is configured to rotate on the first frame about a first axis, wherein the second positioner is configured to rotate on the second frame about a second axis, and wherein the first axis and the second axis are coaxial and extend in a horizontal direction.

12. The robot system according to claim 7, wherein the robot comprises:
    a first arm having a substantially L-shape and including a first base portion and a first extending portion extending from the first base portion along a third rotational axis;
    a second arm provided to be relatively rotatable with respect to the first arm about the third rotational axis and having a substantially L-shape, the second arm including a second base portion and a second extending portion extending from the second base portion along the third rotational axis, the second base portion being connected to the first base portion to be relatively rotatable with respect to the first base portion about the third rotational axis; and a driving motor to relatively rotate the second arm with respect to the first arm about the third rotational axis.

13. The robot system according to claim 7, wherein the positioner is configured to rotate on the first frame about an axis extending in a horizontal direction.

14. The robot system according to claim 9, wherein each of the first and second robots comprises:

a first arm having a substantially L-shape and including a first base portion and a first extending portion extending from the first base portion along a third rotational axis;

a second arm provided to be relatively rotatable with respect to the first arm about the third rotational axis and having a substantially L-shape, the second arm including a second base portion and a second extending portion extending from the second base portion along the third rotational axis, the second base portion being connected to the first base portion to be relatively rotatable with respect to the first base portion about the third rotational axis; and a driving motor to relatively rotate the second arm with respect to the first arm about the third rotational axis.

15. The robot system according to claim 9, wherein the first positioner is configured to rotate on the first frame about a first axis, wherein the second positioner is configured to rotate on the second frame about a second axis, and wherein the first axis and the second axis are coaxial and extend in a horizontal direction.

* * * * *